(12) United States Patent (10) Patent No.: US 7,729,457 B2
Bochkovskiy et al. (45) Date of Patent: Jun. 1, 2010

(54) METHOD OF WEAK SIGNAL ACQUISITION AND ASSOCIATED APPARATUS

(75) Inventors: Andrey Bochkovskiy, St. Petersburg (RU); Mikhail Goloubev, St. Petersburg (RU); Sergey Pospelov, St. Petersburg (RU); Mikhail Vasilyev, St. Petersburg (RU); Valeri Tchistiakov, St. Petersburg (RU); Mikhail Kholostov, St. Petersburg (RU); Sergey Nozdrachev, St. Petersburg (RU); Nikolay Mikhaylov, St. Petersburg (RU); Bijan Jalali, Irvine, CA (US)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1012 days.

(21) Appl. No.: 11/382,704

(22) Filed: May 10, 2006

(65) Prior Publication Data

US 2007/0019714 A1  Jan. 25, 2007

Related U.S. Application Data

(60) Provisional application No. 60/595,837, filed on Aug. 9, 2005, provisional application No. 60/595,660, filed on Jul. 25, 2005.

(51) Int. Cl.
*H03D 1/04* (2006.01)
*H04B 1/00* (2006.01)
*G01S 1/00* (2006.01)

(52) U.S. Cl. .................. 375/346; 375/130; 375/142; 375/145; 375/149; 375/150; 375/340; 375/343; 342/357.12

(58) Field of Classification Search .............. 375/130, 375/142–153, 349, 340, 343, 346; 432/12, 432/357.06; 342/357.12
See application file for complete search history.

(56) References Cited

U.S. PATENT DOCUMENTS

| 3,965,342 | A |   | 6/1976  | Constant |
|-----------|---|---|---------|----------|
| 4,701,934 | A |   | 10/1987 | Jasper   |
| 5,323,322 | A | * | 6/1994  | Mueller et al. .............. 701/215 |
| 5,329,549 | A |   | 7/1994  | Kawasaki |
| 5,347,284 | A |   | 9/1994  | Volpi et al. |

(Continued)

FOREIGN PATENT DOCUMENTS

WO    WO 00/65751    11/2000

(Continued)

OTHER PUBLICATIONS

Phillip Ward, "GPS Satellite Signal Characteristics", Understanding GPS: Principles and Applications, pp. 83-97 pp. Chapter 4, Nov. 30, 2005.

*Primary Examiner*—Mohammad H Ghayour
*Assistant Examiner*—Sophia Vlahos
(74) *Attorney, Agent, or Firm*—Winston Hsu

(57) ABSTRACT

A GPS receiver architecture is disclosed having digital correlation processing in faster than real-time, which is achieved by storing signal samples into a memory in real-time at a first rate and reading packs of stored samples at a second higher rate. For mitigating cross-correlation interference from the strong signal to reception of weak ones, a group of compensator blocks is introduced. A method of interference waveform reproducing is disclosed that compensates influence of stronger signal over long coherent accumulation intervals, not complicating processing of the strong signal over shorter coherent accumulation intervals. Search bins corrupted by under-compensated interference are pre-calculated and discarded.

33 Claims, 10 Drawing Sheets

U.S. PATENT DOCUMENTS

| | | | |
|---|---|---|---|
| 5,420,593 A | 5/1995 | Niles | |
| 5,535,237 A | 7/1996 | LaPadula, III et al. | |
| 5,901,171 A | 5/1999 | Kohli et al. | |
| 6,044,105 A | 3/2000 | Gronemeyer | |
| 6,091,785 A | 7/2000 | Lennen | |
| 6,118,808 A | 9/2000 | Tiemann et al. | |
| 6,236,354 B1* | 5/2001 | Krasner | 342/357.06 |
| 6,300,899 B1 | 10/2001 | King | |
| 6,327,473 B1 | 12/2001 | Soliman et al. | |
| 6,640,107 B1 | 10/2003 | Kuwahara | |
| 7,031,402 B2* | 4/2006 | Takada | 375/296 |
| 7,106,786 B2* | 9/2006 | Turetzky et al. | 375/150 |
| 7,116,704 B2* | 10/2006 | Norman et al. | 375/148 |
| 7,177,614 B2* | 2/2007 | Agarwal et al. | 455/296 |
| 7,180,446 B2* | 2/2007 | Wang et al. | 342/357.15 |
| 7,209,076 B2* | 4/2007 | Roh | 342/357.12 |
| 7,463,189 B2* | 12/2008 | Bryant et al. | 342/357.12 |
| 7,548,199 B2* | 6/2009 | Winternitz et al. | 342/357.15 |
| 7,680,178 B2* | 3/2010 | Raman et al. | 375/150 |
| 2002/0005802 A1 | 1/2002 | Bryant et al. | |
| 2002/0111739 A1* | 8/2002 | Jandrell | 701/214 |
| 2004/0078140 A1* | 4/2004 | Rowitch et al. | 701/213 |
| 2004/0196183 A1* | 10/2004 | Roh | 342/357.12 |
| 2005/0047493 A1* | 3/2005 | Underbrink et al. | 375/150 |
| 2006/0082496 A1* | 4/2006 | Winternitz et al. | 342/357.06 |
| 2006/0211389 A1* | 9/2006 | Lin et al. | 455/138 |
| 2009/0040103 A1* | 2/2009 | Chansarkar et al. | 342/357.12 |

FOREIGN PATENT DOCUMENTS

| | | |
|---|---|---|
| WO | WO 01/86318 A1 | 11/2001 |
| WO | WO 02/23327 A1 | 3/2002 |
| WO | WO 02/23783 A1 | 3/2002 |

* cited by examiner

METHOD OF WEAK SIGNAL ACQUISITION AND ASSOCIATED APPARATUS

CROSS REFERENCE TO RELATED APPLICATIONS

This application claims the benefit of U.S. Provisional Application No. 60/595,660, filed Jul. 25, 2005 and U.S. Provisional Application No. 60/595,837, filed Aug. 9, 2005.

BACKGROUND OF THE INVENTION

1. Field of the Invention

This invention relates generally to navigation systems and more specifically to receiver digital processing methods and apparatus improvements in satellite navigation systems such as the U.S. Global Positioning System (GPS), the Russian Global Navigation Satellite System (GLONASS) and the European Galileo system. For the sake of simplicity, reference will be made below only to the GPS system. The invention is directly applicable to other satellite navigation systems such as GLONASS and Galileo.

2. Description of the Prior Art

A conventional GPS receiver contains an antenna and an analogous front-end (AFE) followed by a digital section comprising, usually, dedicated signal processing circuitry and a digital CPU with related program and data memory and external data interface controllers. The antenna together with the analogous front-end intercept, select (band-pass filter), amplify GPS signals, convert them to a convenient intermediate frequency (IF) normally ranging from DC to several tens of MHz. To perform frequency conversion, the AFE utilizes a reference frequency from a stable reference oscillator. The AFE typically outputs digitized samples of a combination of signals and accompanying noise at IF. The frequency of sampling the AFE output is selected according to the Nyquist criterion, and for the clear/acquisition (C/A) GPS signal component is, at least about 2 MHz. A number of bits in digital AFE samples varies from one to three or four bits.

A digital section of an existing typical GPS receiver contains several correlator channels that perform correlation processing of several GPS satellite signals in parallel. GPS signals employ phase shift keying modulation with pseudo-random noise codes, see, for example, "Understanding GPS: Principles and Applications. Edited by Elliott D. Kaplan. Artech House, Boston, London, 1996, pp. 83-97". Received signals are characterized by a priori uncertainty of signal parameters: its code phase due to unknown (or not ideally known) time of the signal coming to the receiver, and its carrier frequency due to unknown (or not ideally known) Doppler shift and the reference oscillator frequency drift. Signal search in a GPS receiver, i.e. resolution of the above-mentioned uncertainty, requires time. Many applications of GPS need receivers that are capable of acquiring signals rapidly in difficult signal environments. For example, this can be reception of weak GPS signals indoors and in urban canyons. A short time to acquire these weak signals is important both from a direct viewpoint of a user requirement to get the first position fix as soon as possible, and from the viewpoint of supply energy reduction as a result of a short time-to-first-fix (TTFF).

The first, and straightforward, way to accelerate GPS signal processing in the receiver is to increase the number of parallel correlator channels. It is effective (until some practical limit), and it is quite a common practice in design of modern GPS receivers. Examples are: U.S. Pat. No. 5,901, 171 to Kohli et al., or PCT Application No. 2000/65751 by Abraham et al., or almost every GPS receiver on the market. The number of parallel correlator channels reaches 12, 24, and sometimes more. Limits of employing this way of signal processing acceleration in GPS receivers arise due to a proportional growth of hardware complexity and consumed energy with the increase of the number of correlator channels.

Another effective way to accelerate signal processing in GPS receivers is to process signals at a faster-than-real-time rate. The fundamental patents teaching this method are: U.S. Pat. No. 5,420,593 to Niles, and U.S. Pat. No. 5,329,549 to Kawasaki. The essence of the method, according to both patents, is that digitized samples of a combination of signal and noise are written into a digital memory at a real-time rate, and then these samples are reproduced from the memory and processed in correlator channels at a significantly higher rate. As a result, a significantly larger amount of candidate signal replicas are tried in a unit of time thus accelerating the overall signal search process. Different receiver options implementing the method can be found, for example, in U.S. Pat. No. 5,901,171 to Kohli et al., U.S. Pat. No. 6,091,785 to Lennen, U.S. Pat. No. 6,044,105 to Gronemeyer, U.S. Pat. No. 6,118, 808 to Tiemann, and U.S. Pat. No. 6,300,899 to King. The effect gained with the method is bound by the allowed rate of digital processing that reflects the existing technical level in microelectronics, and/or the acceptable power consumed by the digital processing hardware that is, normally, directly proportional to the processing rate.

The third way to accelerate signal processing in GPS receivers is to implement parallel (pseudo-parallel) spectral analysis of preliminary correlation processing results with the help of a Fast Fourier Transform (FFT) or a Discrete Fourier Transform (DFT) method.

Examples of the use of FFT for acquisition of GPS signals may be found in U.S. Pat. No. 4,701,934 to Jasper, and PCT Application No. 2001/86318 by Bryant et al., or U.S. Pat. Application No. 2002/0005802 by Bryant.

Examples of the use of DFT for acquisition of GPS signals may be found in U.S. Pat. No. 5,347,284 to Volpi et al., U.S. Pat. No. 5,535,237 to Volpi et al., PCT Application No. 2002/ 23327 by Van Wechel, PCT Application No. 2002/23783 by van Wechel, and U.S. Pat. No. 6,327,473 to Soliman et al.

When receiving weak GPS signals, for example, in urban canyons, indoor or under trees, a common problem appears associated with the fact that the signals can arrive to the receiver having significantly different strength. The problem is known as cross-correlating interference from stronger signals to affect the processing of weak signals. GPS signaling (its civil C/A component) was designed to be safely processed only if signals from other satellites are not stronger than by about 23 dB, or even less, to have a margin. General measures to mitigate the effect of cross-correlation interference are known. For example, the U.S. Pat. No. 6,236,354 to Krasner describes three techniques to decrease the effect of cross-correlation.

The 1$^{st}$ technique makes use of the evaluated parameters of a strong signal acquired by the receiver, reproduces its waveform, appropriately scales it, and subtracts it from the signal combination at the input before any signal processing to remove the interference component from the input signal. Potentially, this 1$^{st}$ technique is the most effective among the described ones. But implementing this technique as it is described in the U.S. Pat. No. 6,236,354 to Krasner has several disadvantages. First, the compensation of a strong signal can not be full, as there are two contradicting tasks: to suppress the strong signal that interferes with the reception of weak signals, and, simultaneously, to proceed tracking for the strong signal to use it in a navigation solution and continue fine tuning to suppress it. Second, in trying to deeply suppress the strong signal, it is easy to overcompensate it so that the replica becomes stronger than the original signal. There is a serious risk that continued tracking follows the subtracted replica, not the signal. The technique is not robust enough and needs improvement.

The $2^{nd}$ and the $3^{rd}$ techniques of mitigating cross-correlation according to the U.S. Pat. No. 6,236,354 to Krasner make use of the evaluated parameters of a strong signal acquired by the receiver, predict the cross-correlating effect from the strong signal to the anticipated weak signal, and correct the correlations accumulated for this weak signal. The difference between the techniques is that the $2^{nd}$ one comprises subtracting the predicted effect from the accumulations, and the $3^{rd}$ one simply discards potentially injured accumulations. A disadvantage of the $2^{nd}$ and the $3^{rd}$ techniques is their high computational requirements to predict the cross-correlation for all possible combinations of signals' PRN codes, code phase differences, and Doppler frequency differences. Possible simplifications reduce the effectiveness of the techniques. Another disadvantage of the $3^{rd}$ technique is that discarded accumulations may contain the desired signal correlations, and the probability of this occasion rises with the strength of the interfering signal or, equally, with a decrease of the weak signal power. The above-mentioned disadvantages of the $1^{st}$ technique proscribe effectively combining the techniques, for example, the $1^{st}$ and the $3^{rd}$ ones, and thus do not allow relaxing requirements of the $3^{rd}$ technique.

SUMMARY OF THE INVENTION

An objective of the present invention is to provide GPS receiver architecture with processing in faster than real-time, and a method of acquiring both strong and weak GPS signals that optimizes utilization of hardware resources of the GPS receiver.

According to the present invention, a method includes accumulating strong signals of a received signal over a short coherent accumulation period, estimating parameters of the strong signals, accumulating weak signals of the received signal over at least a long coherent accumulation period, compensating a strong signal cross-correlating effect in the weak signals to obtain a compensated signal, and performing a weak signal acquisition process on the compensated signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

This invention is illustrated by means of accompanying drawings. However, these figures represent examples of the invention and do not serve to limit its applicability.

DETAILED DESCRIPTION

Figure 1:
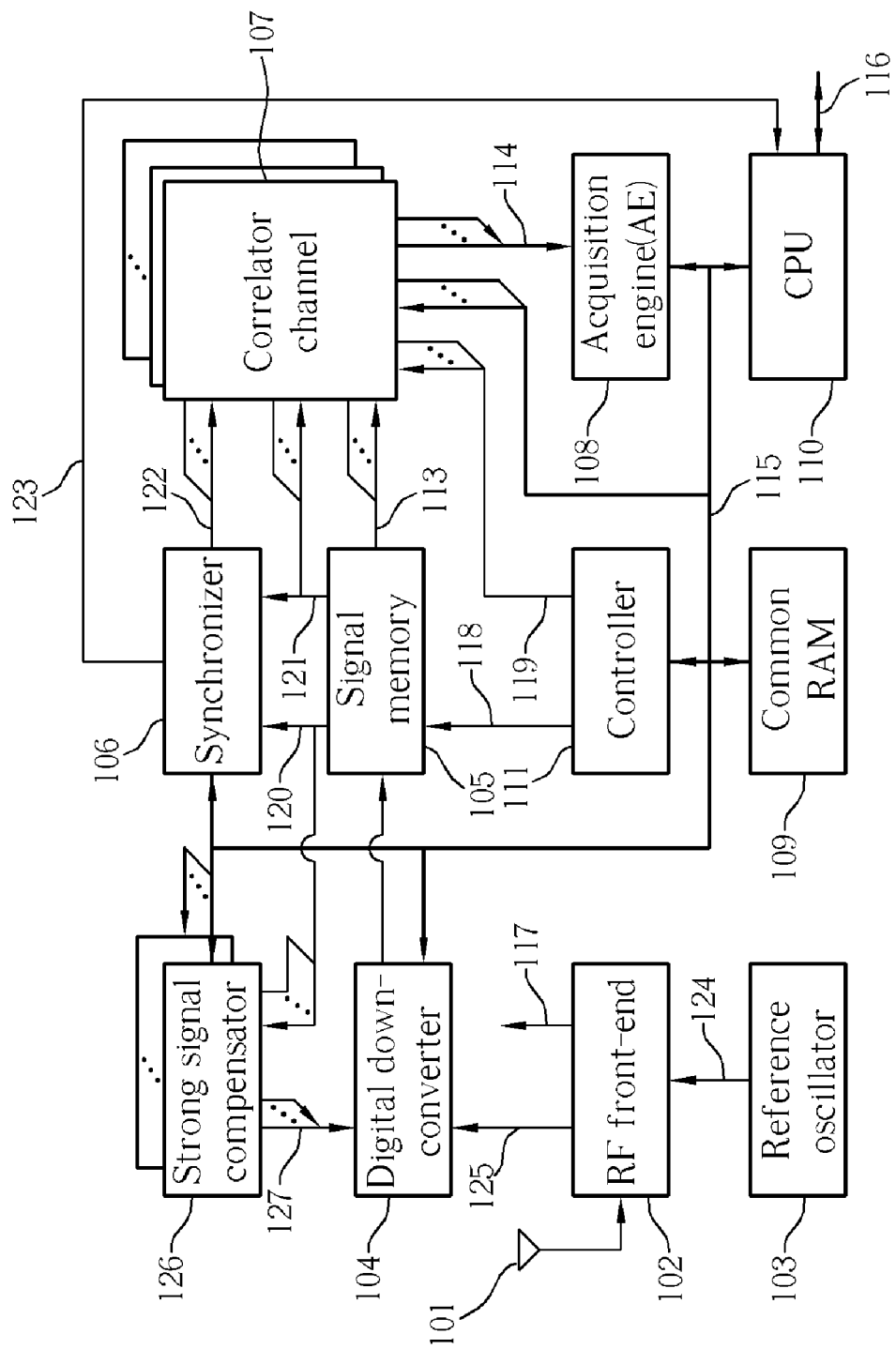
FIG. 1 is a block diagram of a GPS receiver according to one embodiment of the present invention.

FIG. 1 illustrates a GPS receiver according to one embodiment of the present invention. The GPS receiver comprises an antenna 101, a radio frequency (RF) front-end (FE) 102 with a connected reference oscillator 103, a digital down-converter 104, a group of strong signal compensators (SSC) 126, a signal memory 105, a synchronizer 106, a group of connected in parallel correlator channels 107, an acquisition engine (AE) 108, a common random access memory (RAM) 109, a CPU with a memory and a user interface 116, and a controller 111. The CPU 110 is coupled with the digital down-converter 104, with the correlator channels 107, with the common RAM 109, and with the controller 111 by a common data bus 115. The CPU 110 is for determining a receiver position, velocity, or time.

The RF FE 102 of GPS receiver typically comprises amplifier elements, including a low-noise input amplifier; bandpass filters for preliminary frequency selection of signals from noise and interference; one or more stages of signals frequency down-conversion; a frequency synthesizer for deriving local oscillator frequency from the reference oscillator 103 frequency, the same synthesizer typically also generating a digital clock 117 (main clock) to run all the digital processing throughout the receiver; and an output analog-to-digital converter of the signal at intermediate frequency, normally, with a number of conversion bits from 1 to 3, and with a single (real) or a complex pair of outputs 124. Preferably, the RF FE 102 utilizes a single stage of frequency conversion. Preferably, the reference oscillator 103 is a crystal oscillator with a relative instability of 2-30 parts per million.

Figure 4:
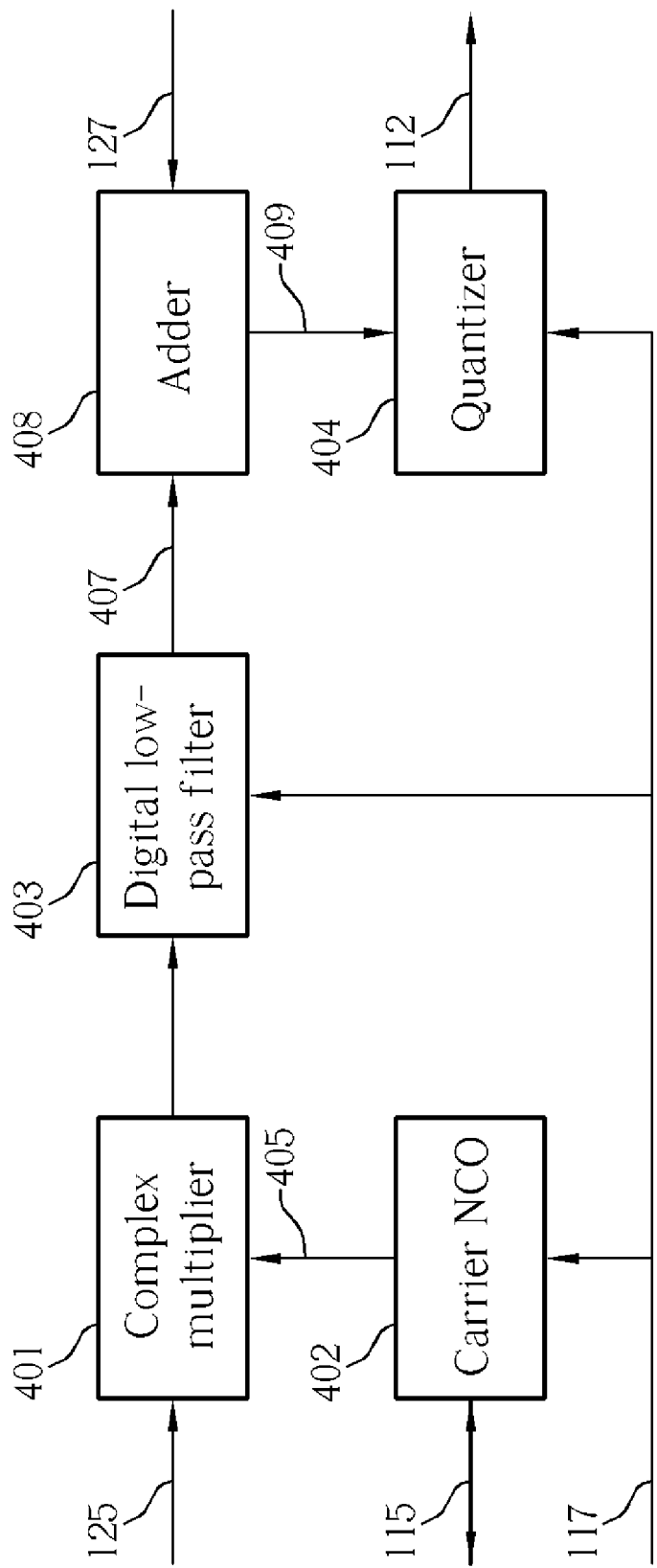
FIG. 4 is a block diagram of one embodiment of the digital downconverter according to one embodiment of the present invention.

FIG. 4 shows the digital down-converter (DDC) 104 according to a preferred embodiment of the present invention. The digital down-converter (DDC) 104 comprises a complex multiplier 401, a carrier numerically-controlled oscillator (NCO) 402, a digital low-pass filter 403, an adder 408, and a quantizer 404. An input 125 of the complex multiplier 401 represents the signal input of the DDC 104. An output 112 of the quantizer 404 represents the signal output of the DDC 104. Inputs of the carrier NCO 402 and of the digital low-pass filter 403 represent the clock input of the DDC 104 and receive the clock output 117 from the RF FE 102. The complex multiplier 401 together with the carrier NCO 402 convert digital samples of the combination of GPS signals and noise from the IF to baseband. The digital low-pass filter 403 filters away aliases. The adder 408 is intended to subtract, from the filtered multi-bit combination of signals and noise, strong signal replicas generated by the strong signal compensators 126. The quantizer 404 limits the number of bits in the signal output 112 of the DDC 104 to be further stored in the signal memory 105. Preferably, the carrier NCO 402 produces complex samples 405 of a frequency close to the IF commanded via the digital data bus 115, i.e., a local intermediate frequency carrier waveform. The carrier NCO 402 operates at the clock rate of the output signal 117 of the RF FE 102. The complex multiplier 401 can be implemented either based on digital multiplying and (algebraic) summing (number of bits defined by the RF FE 102 output 125), or as a look-up table of all possible combinations of input sample values. Preferably, the digital low-pass filter (LPF) 403 is implemented as a quadrature pair of finite impulse response filters based on register delay lines with 64 taps each and a 9-bit representation of filter coefficients. The adder 408 can be implemented as a multi-bit arithmetic adder of several SSC 126 output waveforms 127 with the digital LPF 403 output 407.

Implementation of the quantizer 404 depends on the choice of the number of bits in the samples to be stored in the signal memory 105. For single bit samples, the quantizer 404 degenerates to a circuit just passing to its output the sign bit of the digital LPF 403 output signal 407. In the preferred embodiment, for a 2-bit output samples representation, an additional comparator is included in the quantizer 404. A simple digital filter based on an accumulator, for example, can derive the threshold for the comparator. Added or subtracted accumulation constants define the desired relationship of output samples 407 that exceed, or not exceed, the threshold. For example, the relationship 30% to 70% for exceed to not exceed samples is commonly regarded to be close to the optimum. Then, if the threshold is exceeded, the accumulator is diminished by 7, and, if it is not exceeded, the accumulator is increased by 3. The most significant bits of the accumulator comprise the threshold value. The number of bits in the accumulator and the clocking rate define the filter time constant of the quantizer 404.

Figure 5:
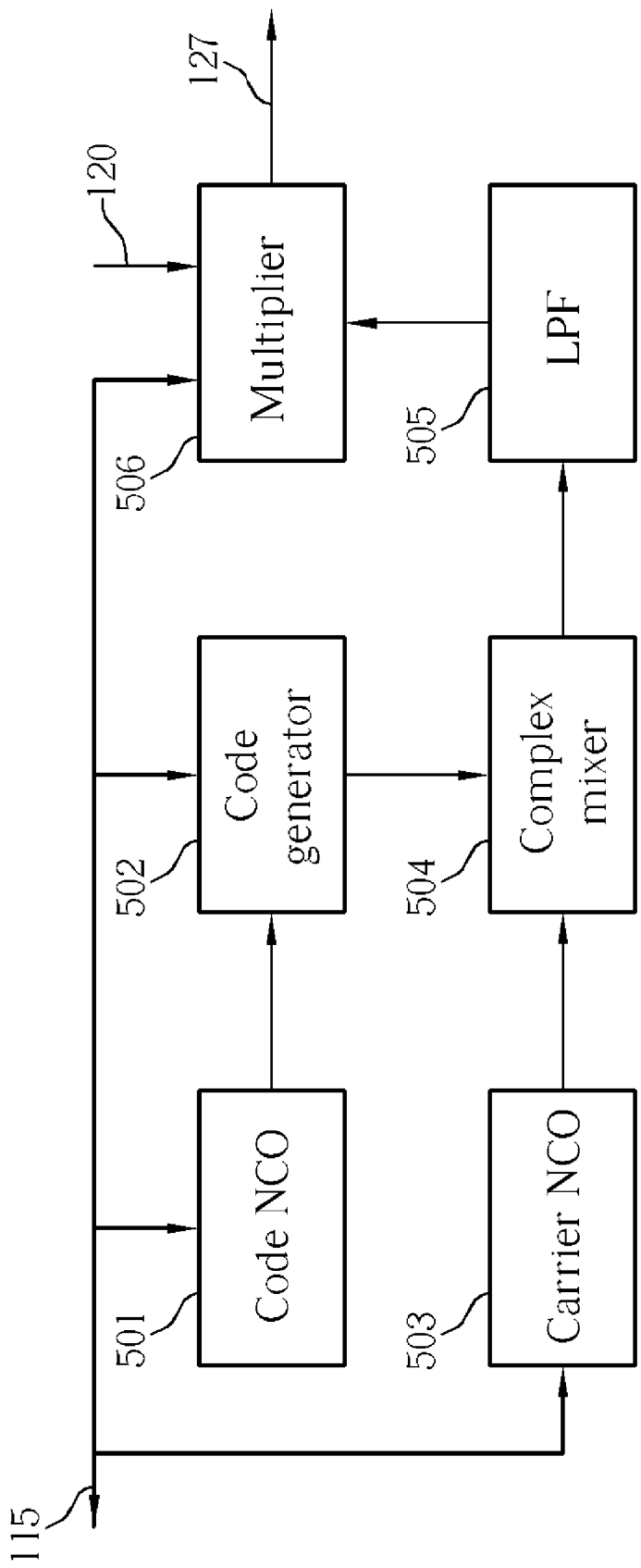
FIG. 5 is a block diagram of the strong signal compensator according to one embodiment of the present invention.

FIG. 5 shows the strong signal compensator (SSC) 126 according to a preferred embodiment of the present invention, comprising a code NCO 501, a code generator 502, a carrier NCO 503, a complex mixer 504, an LPF 505, and a multiplier 506. The code NCO 501, the code generator 502, the carrier NCO 503, and the multiplier 506 are coupled to the common data bus 115 to apply controls, preferably from the CPU 110. Strong signal parameters estimated throughout the acquisition and/or tracking of the signal are used to apply appropriate controls. Code frequency and phase are used to control the code NCO 501 and the code generator 502; carrier frequency and phase are used to control the carrier NCO 503; a signal power estimate is used to calculate an appropriate scaling factor applied to the multiplier 506. In one attractive implementation, two different values of the scaling factor can be alternated in time with the portions of samples written into the signal memory 105. For this reason, a write pointer signal 120 is fed from the signal memory 105 to the multiplier 506 of the SSC 126.

Figure 3:
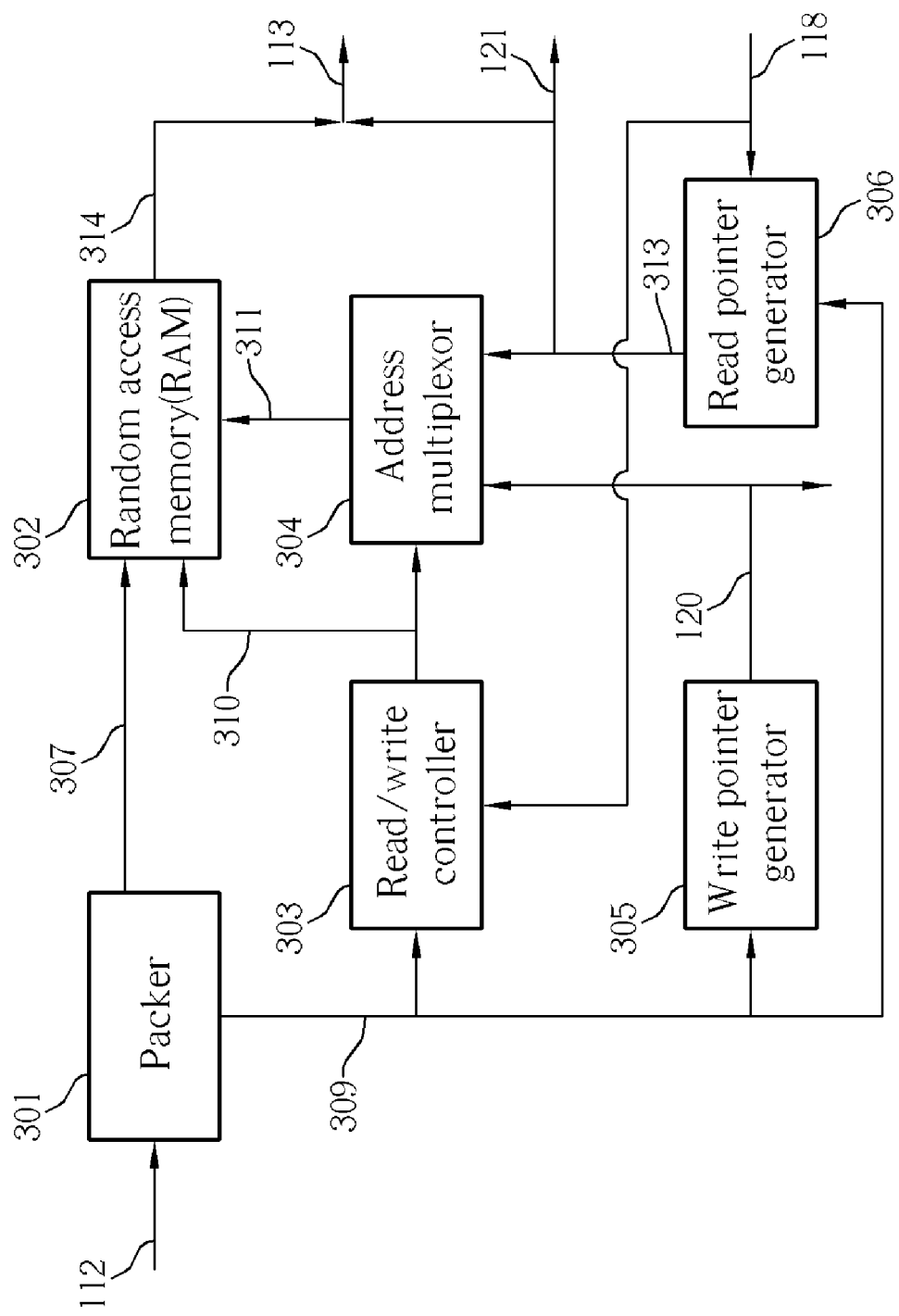
FIG. 3 is a block diagram of the signal memory according to one embodiment of the present invention.

FIG. 3 shows the signal memory 105 according to a preferred embodiment of the present invention, comprising a packer 301, a random access memory (RAM) 302, a read/write controller 303, an address multiplexor 304, a write pointer generator 305, and a read pointer generator 306. The input of the packer 301 receives the signal memory 105 input 112. Data output 314 of the RAM 302 and the output 313 of the read pointer generator 306 form the signal memory 105 output 113. Complex samples of the signal 112 that comes from the DDC 104 at a sampling rate matched with its pass band are combined within the packer 301 into packs of several (N) samples, for example, four or eight complex samples. The random access memory (RAM) 302 can be a single ported one, for example, with a number of bits corresponding to the length of packs. For example, for a 2-bit quantizing of samples, and the length of packs equal to four, each pack (either 307 or 314) occupies 16 bits to store both in-phase and quadrature components. Regarding the read/write control, the signal memory 105 is preferably implemented as a cyclic buffer. Packs are written into the RAM 302 and are read from it by cyclically changing (to the same direction) addresses 311 formed by the address multiplexor 304 from the write pointer 312 or from the read pointer 313 depending on the current operation (write or read) 310 defined by the read/write controller 303. The write pointer generator 305 and the read pointer generator 306 can be implemented, for example, as counters. The state of the write pointer generator 305 is incremented with a validity signal 309 of another sample pack 307. The state of the read pointer generator 306 is incremented with every read clock, if the signal 118 enabling reads is valid. Let C denote the clock rate of the receiver digital part, S the sampling rate, and N the number of samples in a pack. Then, the number of read cycles throughout the whole RAM volume during one whole write cycle to this same RAM can be expressed as $C*N/S-1$. For example, for the clock rate C=50 MHz, the sample rate S=2.048 MHz, and the number of samples in a pack N=4, during one complete write cycle to the RAM 302, approximately 96.6 complete read cycles from the RAM 302 are executed.

In the preferred embodiment of the present invention, the synchronizer 106 gets the write pointer 120 and read pointer 121 codes from the signal memory, and is controlled from the CPU 110 via the data bus 115. Preferably, the synchronizer 106, after a fixed number of write pointer 120 steps, latches the code of the write pointer 120, generates a signal 122 on every occurrence of the read pointer 121 equal to the latched value of the write pointer during a whole cycle of the write pointer 120 started and finished on its latched value, and generates an interrupt 123 for the CPU after the burst of the signal 122 pulses.

Figure 2:
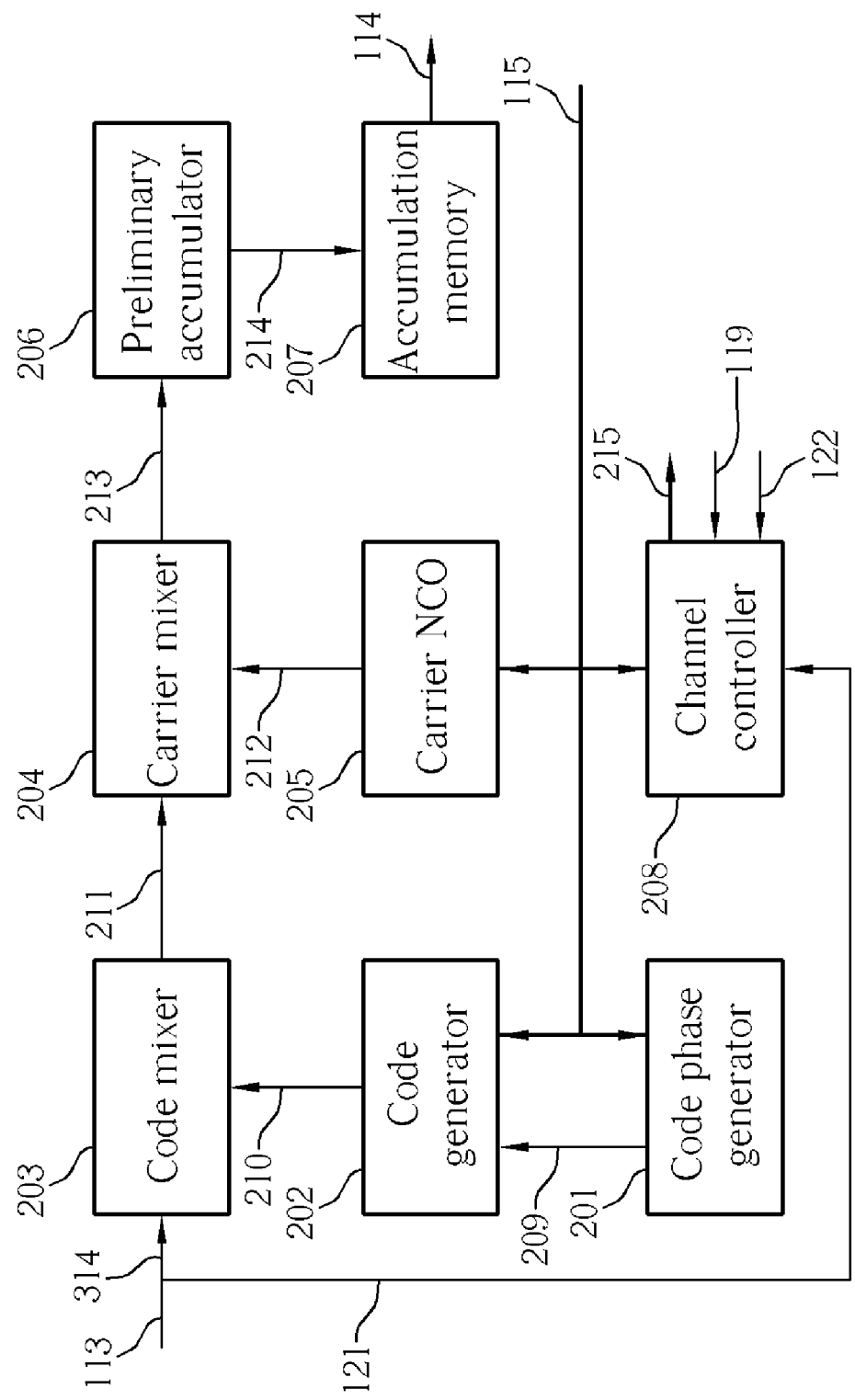
FIG. 2 is a block diagram of the correlator channel according to one embodiment of the present invention.

Parallel correlator channels 107, in FIG. 1 or FIG. 2, can be identical. Their inputs are connected to the output 113 of the signal memory 105, and their outputs are combined in a data bus 114 that is coupled to the acquisition engine 108. FIG. 2 shows the correlator channel 107 comprising a code phase generator 201, a code generator 202, a code mixer 203, a carrier mixer 204, a carrier NCO 205, a preliminary accumulator 206, accumulations memory 207, and a channel controller 208. The code generator 202, driven by the code phase generator 201, produces packs of the signal replica 210 that are multiplied in the code mixer 203 with the corresponding received sample packs 113. The results within the packs are summed (signal 211) and further multiplied (in the carrier mixer 204) by the replica carrier samples 212 produced in the carrier NCO 205. The above summing is performed as despreading in the code mixer 203 significantly narrows signal spectrum (signal 211). After the carrier mixer 204, output signal samples 213 are averaged in the preliminary accumulator 206 throughout a time interval defined by the a priori uncertainty of signal frequency. Accumulations memory 207 stores a batch of consecutive results 214 from the preliminary accumulator 206 to be further processed in the acquisition engine 108. The length of the batch is coordinated with the number of points in the Fourier transform performed in the acquisition engine 108. The code phase generator 201 produces a signal 209 required to advance the code generator 202 by calculating the value of code phase advance throughout the interval corresponding to the length of sample packs 113 and 210. The code generator 202, on each clock, produces a pack 210 of the local signal replica comprising several single-bit code samples.

The code mixer 203 multiplies input pack 113 complex pairs of samples (1-3 bits) by corresponding single-bit samples of code replica 210 coming from the code generator 202, and arithmetically adds the products throughout the pack separately for in-phase and quadrature components. Various implementations of the code mixer 203 can be made by those skilled in the art, especially accounting for only a few bits representing the operands.

Implementation of the carrier NCO 205 of the correlator channel 107 is similar to that of the carrier NCO 402 of the DDC 104. Besides that, the carrier NCO 205 contains a register that holds the carrier phase value latched at a measurement epoch defined by the synchronizer 106 and enabled by the channel controller 208.

The carrier mixer 204 can be implemented either based on digital multiplying and (algebraic) summing (the number of bits is defined by the code mixer 203 output 211 and carrier replica samples 212), or as a look-up table of all possible combinations of input sample values. The number of bits at the output 213 of the carrier mixer 204 depends on that of the inputs 211 and 212. For example, for two bits at the input 113 of the channel correlator 107, four samples in a pack, and five bits of the local carrier replica representation, the number of bits of the result at the output 213 of the carrier correlator 204 is equal to eight.

The preliminary accumulator 206 separately accumulates the in-phase and quadrature components of complex output 213 of the carrier mixer 204 throughout a predefined interval of coherent accumulation. The interval is defined by the CPU 110, and transferred to the channel controller 208 via the common digital data bus 115 either directly or through the controller 111. The channel controller 208 enables starting processing in the channel when the read pointer 313 from the signal memory 105 reaches the value coinciding with the predetermined one, and disables processing after a predetermined number of processing steps. The channel controller 208 enables also, allowed by the CPU control, applying measurement epoch signals 122 to the code phase generator 201 and the carrier NCO 205. Throughout processing, the channel controller 208 enables accumulation by the preliminary accumulator 206 over the predefined interval, commands transferring the accumulations 214 to the accumulations memory 207, and commands resetting the preliminary accumulator 206, after which the latter is ready for a new accumulation cycle. The above mentioned and all other necessary controls by the channel controller 208 are represented in FIG. 2 as a generalized signal line 215. For example, the accumulation interval is equal to 1/16 ms (i.e. the C/A code epoch) that enables accumulation coherency of the received signals that fall into a band of ±8 kHz. Preferably, the accumulations memory 207 comprises two identical sections, one being filled with new accumulations 214, while another is available for reading from the acquisition engine 108. The volume of each section of the accumulations memory 207 is sufficient to store a number of accumulations that can be processed by the acquisition engine 108 in a single invocation. Preferably, the volume of each section of the accumulations memory 207 is equal to 32 complex results that corresponds, with the accumulation interval of 1/16 ms, to a 2 ms long accumulations batch stored.

Figure 6:
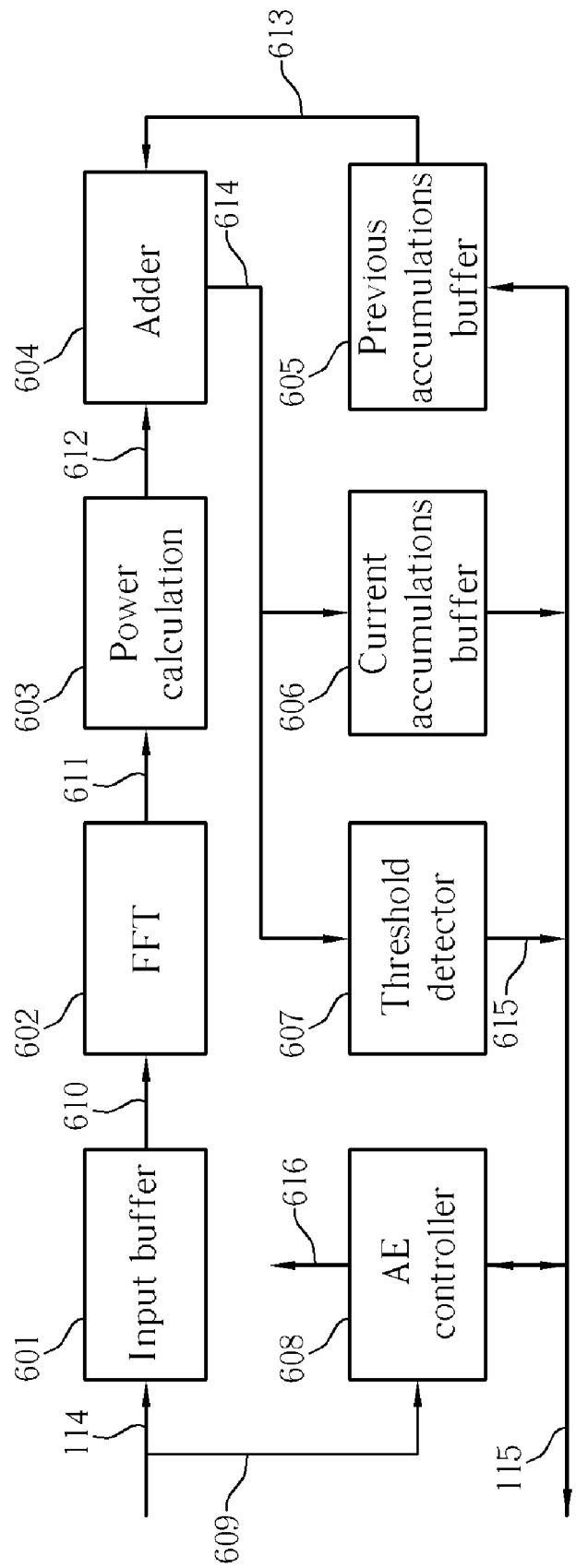
FIG. 6 is a block diagram of the acquisition engine according to one embodiment of the present invention.

FIG. 6 shows the acquisition engine (AE) 108 according to a preferred embodiment of the present invention, comprising an input buffer 601, an FFT 602, a power calculation 603, an adder 604, a previous accumulation buffer 605, a current accumulation buffer 606, a threshold detector 607, and an AE controller 608. The acquisition engine 108, due to its high processing efficiency, sequentially serves the requests from all the correlator channels 107. After a correlator channel 107 has processed a predetermined batch of signal packs, the correlator channel 107 issues a request 609 to the acquisition engine 108, and the latter downloads preliminary accumulations 114 from the correlator channel 107 into the input buffer 601, applies the FFT 602 to the buffered data 610, converts the obtained amplitude spectrum 611 with the power calculation 603 into a power spectrum 612, adds these powers 612 to the previous accumulations 613 from the previous accumulation buffer 605, places the results 614 into the current accumulation buffer 606 and compares the results 614 against a predetermined threshold in the threshold detector 607. Simultaneously with the downloading of new previous accumulations from the common RAM 109 and new preliminary accumulations 114 from another correlator channel 107, the current accumulation buffer 606 is uploaded into the common RAM 109. When results exceed the threshold, the code and frequency search bin numbers are also downloaded to the common RAM 109. In another attractive embodiment of the present invention, the non-coherent accumulations stored in the common RAM 109 are further processed, including the comparison against a signal detection threshold, by software running in the CPU 110.

FFT 602 transforms batches of 32 (zero-padded up to 64) complex (I and Q) 32-bit fixed-point preliminary accumulations 114 into 64 complex spectral components. High processing efficiency of the FFT 602 is gained due to a parallel processing, for example, implementing a radix-4 FFT. This means that in one clock cycle the FFT 602 processes 4 preliminary accumulations 114. The input buffer 601 is implemented like a first-in-first-out (FIFO) buffer of depth 64, with a single 2×32-bit input of complex data 114 and four 2×32-bit outputs connected to four FIFO taps separated in depth by 16 words, thus forming a concatenated 2×128-bit data output 610. The power calculation 603 calculates the squares of complex components 611, four values per clock. In this embodiment, power calculation 603 comprises four complex multipliers based on arithmetic multipliers and adders. The adder 604 comprises four arithmetic adders. The format of current and previous accumulations 613 and 614 summed in the adder 604 may differ from the format of storing them in the common RAM 109 and in the accumulation buffers 605 and 606. Preferably, the adder 604 operates with portions of four 32-bit fixed-point words, and the results are stored in the common RAM as pairs of 16-bit floating-point words. Converting formats can be performed by the accumulation buffers 605 and 606. The previous accumulation buffer 605 and the current accumulation buffer 606 can be implemented in different ways by those skilled in the art. The threshold detector 607 comprises a register of the threshold value, four subtractors that compare four current accumulations 614 against the threshold, and a logic circuit that forms a record 615 with numbers of frequency bins where the accumulations exceed the threshold. Masking hitting the threshold at specific frequency bins is performed via the common data bus 115 to exclude accumulations potentially injured, for example, by cross-correlating interference. The AE controller 608 accepts the requests from the correlator channels 107 and generates sequences of control signals 616 enabling the described above interaction. Preferably, the common RAM 109 comprises a standard single-ported random access memory of 8K 32-bit words. Preferably, the CPU 110 can be selected from a wide range of 32-bit processors either with fixed or with floating-point, for example, TMS320C31, ADSP21060, ARM7TDMI or another, supplemented by a data interface according to RS-232c, USB or another standard.

In a preferred embodiment of the present invention, the controller 111 initializes the correlator channels 107 to perform a correlation processing task of a next batch of signal sample packs 113 by downloading new tuning data from the common RAM 109 to the correlator channels 107, and uploading current tunings to the common RAM 109 to reserve a possibility to revert to the suspended correlation processing task with a new batch of signal sample packs 113, and transfers, as an option, preliminary accumulations 114 from the correlator channels 107 to the common RAM 109. The controller 111 operation is synchronized with the signal memory 105 filling with sample packs. Output control signals of the controller 111 are represented in FIG. 1 by the lines 118 and 119. In the framework of the current invention, various implementations of the controller 111 are possible. One attractive implementation is based on the use of a digital microcontroller that performs all actions to control the correlator channels 107 according to a program (or settings, such as correlator channel settings) stored in the internal memory of the microcontroller.

Figure 7:
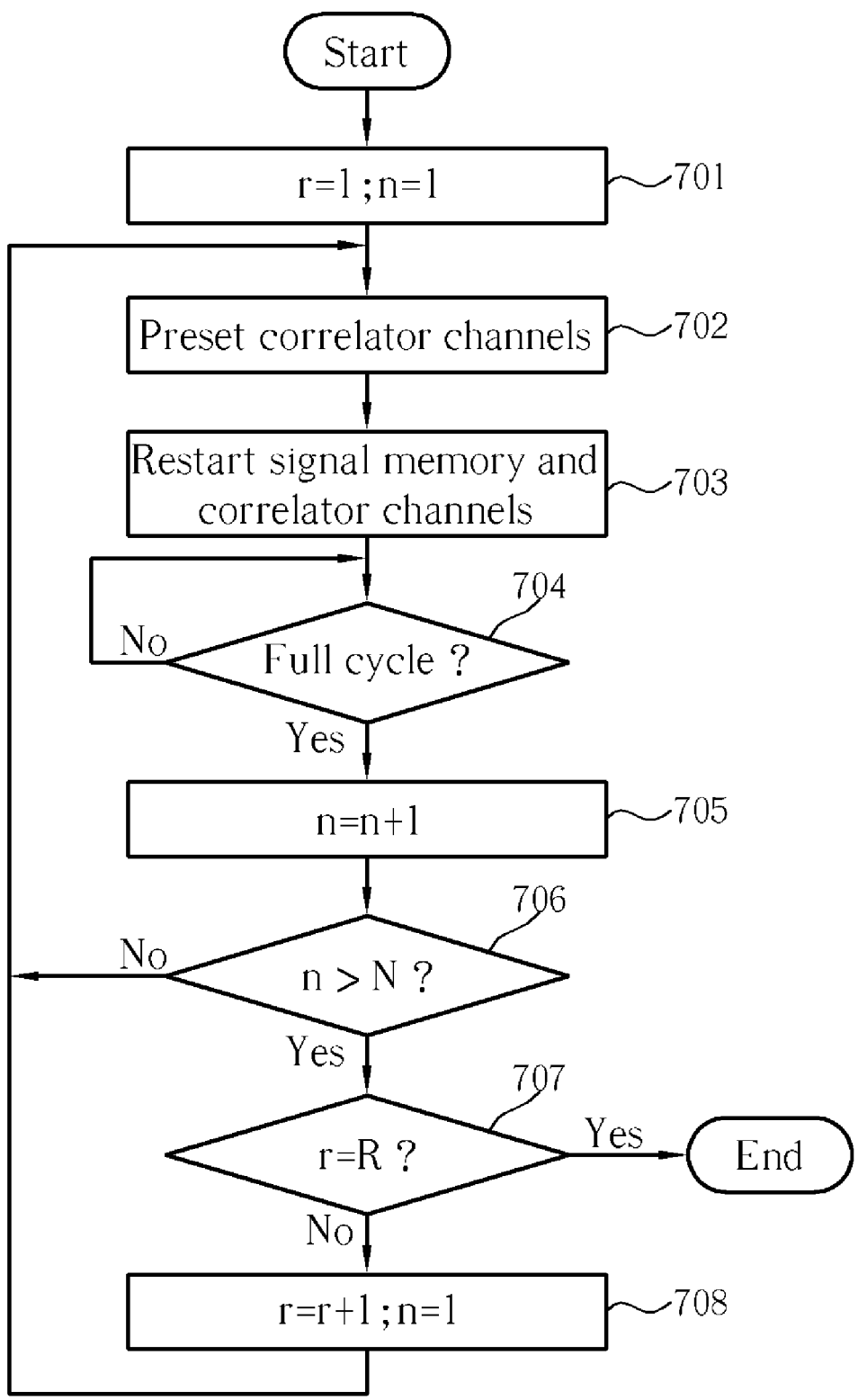
FIG. 7 is a flow chart describing the controller algorithm according to one embodiment of the present invention.

FIG. 7 shows an operation flow chart of controller 111 during acquisition of signals and the interaction of the controller 111 with the signal memory 105 and correlator channels 107 according to a preferred embodiment of the present invention. In step 701, a current number n of the code search bin and a current number r of the code search bin group are initialized. In step 702, correlator channels 107 are preset to start the search of signals from the desired search bins. In step 703, the signal memory 105 and correlator channels 107 are invoked. The controller 111 passes from step 704 to step 705 when a full read cycle of the signal memory 105 is executed. The current number n of the code search bin is incremented in step 705. In step 706, the controller 111 determines if the current number n of the code search bin is greater than the desired number N of the bins within the code search group. In step 707, the controller 111 determines if the current number r of the code search bin group has reached the desired number R of the code search bin group. In step 708, the current bin number n is reset, and the group number r is incremented before a new cycle of the search starts from step 702. After all search bins are passed (r=R at step 707), a current level of signal acquisition is finished.

Figure 8:
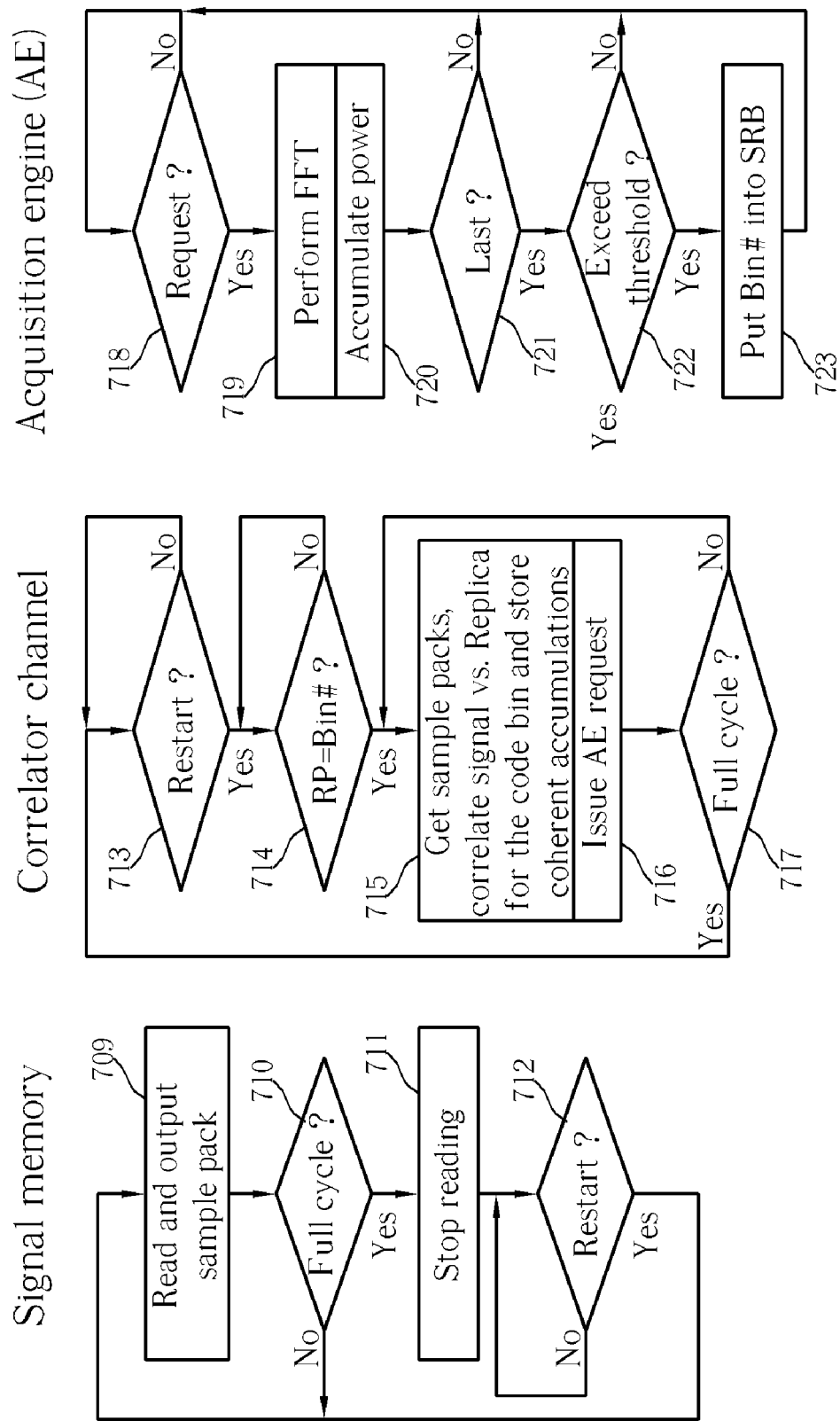
FIG. 8 comprises flow charts describing the algorithms of the signal memory controller, the correlator channel controller, and the acquisition engine controller according to one embodiment of the present invention.

FIG. 8 shows an operation flow chart of the controllers, including the read/write controller 303 of the signal memory 105, channel controller 208 of the correlator channels 107, and AE controller 608 of the acquisition engine 108 during acquisition of signals, and their interaction with the controller 111 according to a preferred embodiment of the present invention. The signal memory 105, under control of the read/write controller 303, stores new signal samples unconditionally. The read/write controller 303 reads and outputs sample packs through steps 709 and 710 until a full cycle of preset length is executed. Through steps 711 and 712 reading from the signal memory 105 is stopped until it is again re-invoked by the controller 111. In steps 713 and 714, the channel controllers 208 of correlator channels 107 start after they are invoked from the controller 111 and when a sample pack is read from a position (determined by the read pointer) corresponding to the desired code search bin (RP=Bin#) in the signal memory 105. In step 715, the correlator channels 107 correlate sample packs from the signal memory 105 with corresponding signal replicas, store coherent accumulations. Further, in step 716, issue requests to the acquisition engine 108 for processing of the stored accumulations when a predetermined number of the latter is produced. In step 717, the channel controller 208 determines if a full cycle of sample packs, corresponding to the volume of the signal memory 105, has been processed. Depending on the determination result, either correlation is continued, or the channel controller 208 stops at step 713 waiting for a new invocation. In step 718, the AE controller 608 of the acquisition engine 108, waits for a request from correlator channels 107. In step 719, the AE controller 608 commands performing a fast Fourier transform on the accumulations got from the correlator channel 107 that issued the request. In step 720, transformed data points are squared and further accumulated. In step 721, the AE controller 608 determines if the request is marked as the last one by the correlator channel 107. In step 722, accumulated power spectrum lines are compared against a preset threshold. If accumulated powers exceed the threshold, then in step 723 the AE controller 608 puts corresponding search bin numbers into the search result buffer in the common RAM 109.

Figure 9:
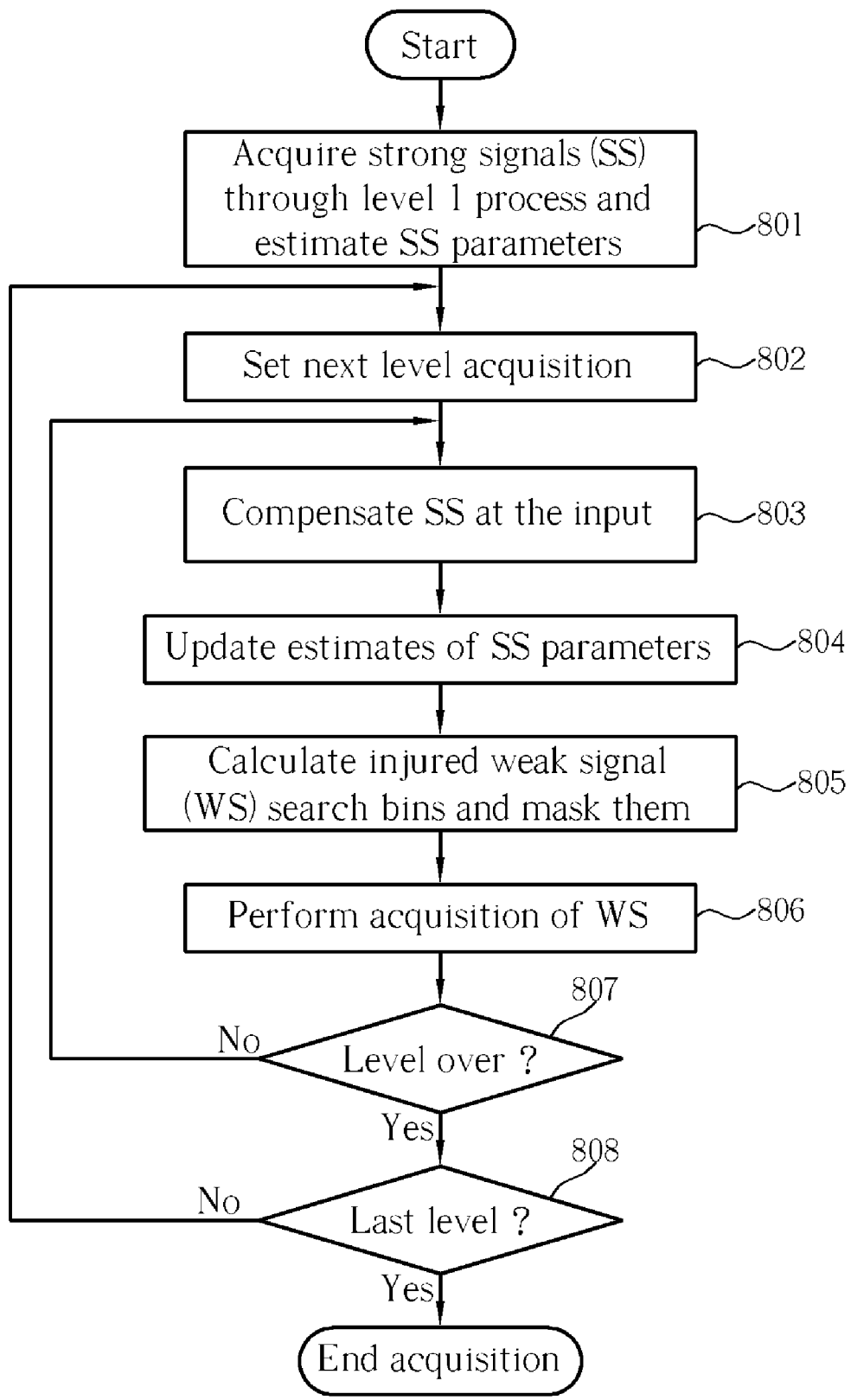
FIG. 9 is a flow chart of signals acquisition according to one embodiment of the present invention.

The method of acquiring signals according to the present invention is illustrated by FIG. 9 and comprises steps through several levels of searching the signals, starting from the strong ones and then trying weaker ones, and actions to mitigate the cross-correlating interference from strong signals to the acquisition of weak signals. The levels differ by duration of coherent and non-coherent accumulation intervals throughout the correlation processing of signals. The combinations of coherent and non-coherent accumulation times are optimized to utilize hardware resources of the GPS receiver throughput of its correlator channels 107 operating in faster than real-time, throughput of its acquisition engine 108, which tries a multitude of frequency search bins in parallel, and volume of common random access memory (RAM) 109 storing accumulations so that the a priori uncertainty of the signal parameters are covered through the signal search in a most effective way.

FIG. 9 is a flow chart of signals acquisition according to one embodiment of the present invention. In step 801, strong signals (SS) are acquired and their parameters are estimated through a first level process, for example, by a comparatively short coherent accumulation time selected in the region of 1-4 ms, so that the associated signal detection bandwidth is wide, that is 250-1000 Hz for a single frequency bin, or about 8-32 kHz with a 64-point FFT in the acquisition engine 108. The total accumulation time to test a signal search bin is preferably selected in accordance with the signal memory 105 volume. With such a choice, the common RAM 109 stores non-coherent accumulations only for a single code bin multiplied by the number of frequency bins, equal to the number of FFT points, covered in one run by the acquisition engine 108, and multiplied by the number of parallel correlator channels 107 of the GPS receiver. Preferably, the coherent accumulation time to acquire and track strong signals is equal to the GPS data bit duration (20 ms) divided by an even number, for example, equal to 2 ms, and the volume of the signal memory 105 is capable of storing 40 ms of signal sample packs. Signals with a carrier-to-noise ratio down to about 32 dBHz are acquired at this level of signals acquisition. Preferably, the parameters of the strong signals that are estimated comprise code frequency and phase, carrier frequency and phase, and signal amplitude.

In step 802, a next level of the signals acquisition process is initialized. At the second level, weak signals those, for example, with the carrier-to-noise ratio values below 30-32 dBHz are acquired. The coherent accumulation time to acquire weak signals is selected to be longer than that for strong signals. Preferably, the coherent accumulation time to acquire weak signals is equal to the GPS data bit duration (20 ms). Accumulation intervals are preferably synchronized with the data modulation bits of signals to be acquired. The signal detection bandwidth associated with a 20 ms coherent accumulation time is about 50 Hz for a single frequency bin, or about 1.6 kHz with a 64-point FFT in the acquisition engine 108. The results of the coherent accumulations throughout a multitude of frequency bins calculated by the acquisition engine 108 are further non-coherently accumulated in the common RAM 109 for the entire search pattern. The size of the latter is the total number of search bins that is (i) a product of the correlator channel clock rate to the sampling rate ratio, (ii) the number of samples in a sample pack that is processed at a single clock, (iii) the number of frequency bins, equal to the number of FFT points, covered in one run by the acquisition engine 108, and (iv) the number of parallel correlator channels 107 of the GPS receiver. Depending on the a priori signal parameter uncertainty, the available volume of the common RAM 109 might be insufficient to store accumulations in parallel for the whole search pattern. Then, the whole search pattern is subdivided into smaller portions, which are tried sequentially.

According to a preferred embodiment of the present invention, at the third acquisition level, depending on the anticipated range of a priori signal parameter uncertainty and on the availability of data bit aiding, one of the two following strategies is selected. The $1^{st}$ is to lengthen the interval of non-coherent accumulation to try further even weaker signals. The $2^{nd}$ is to use extra-long coherent accumulation of correlations, about hundreds or thousands of milliseconds long. The signal detection bandwidth associated with such extra-long coherent accumulation time, for example, equal to 640 ms is about 1.5 Hz for a single frequency bin, or about 50 Hz with a 64-point FFT in the acquisition engine 108. The acquisition level is determined by a coherent accumulation period and a non-coherent accumulation period.

Figure 10:
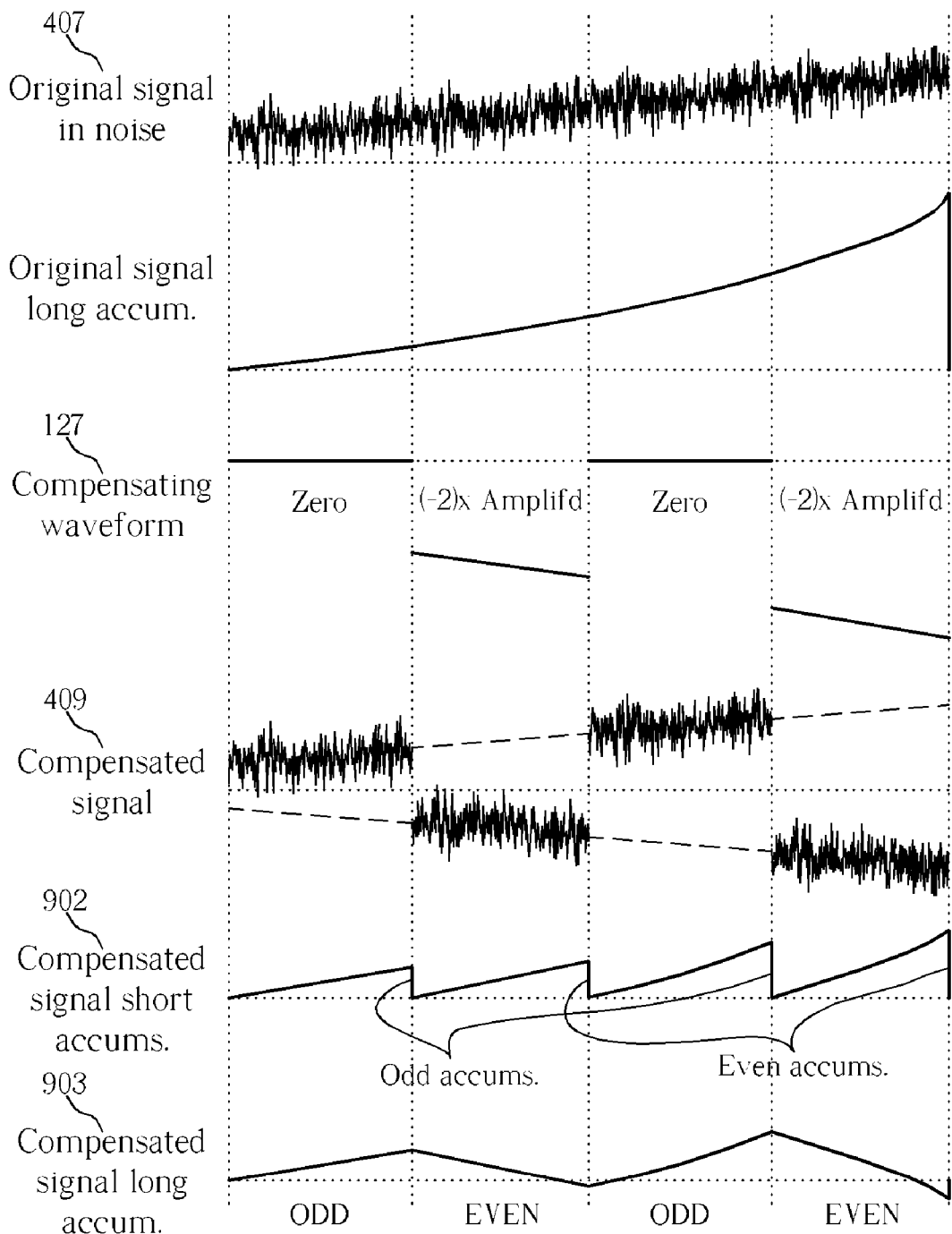
FIG. 10 illustrates a cross-correlation mitigation technique by compensating strong signals in the digital down-converter before signal processing according to one embodiment of the present invention.

FIG. 10 illustrates a cross-correlation mitigation process diagram by compensating strong signals in the digital down-converter before signal processing according to one embodiment of the present invention. In step 803, compensation of the strong signal cross-correlating effect on the reception of weak signals is performed in the digital down-converter 104. For the purpose of compensating, strong signal compensators 126 reproduce waveforms of the strong signals according to estimated parameters of the latter. Preferably, the reproduced waveform is scaled so that the amplitude of the waveform 127 is equal to zero on odd short coherent accumulation periods and is equal to twice the amplitude of a reproduced strong signal on even short accumulation periods. Generally, this scaling can be differently applied through sub-intervals of coherent integration intervals of weak signals or even not applied to some sub-intervals. Specific attribution of the two kinds of scaling, correspondingly, to odd or even accumulation periods is not important. The compensating waveform 127 is subtracted from the original signal 407 in the adder 408 of the digital downconverter 104 resulting in a compensated signal 409 that acquires an artificial periodic binary phase shift keying (BPSK) modulation. This BPSK modulation destroys coherent accumulations 903 of the signal over long intervals that are even multiples of the duration of short coherent accumulations, for example, 20 ms.

In step 804, parameter estimates of strong signals are updated based on coherent accumulations over short intervals 902 synchronized to half-periods of the artificial BPSK modulation. The original strong signals 407 are integrated over odd short accumulation intervals 902. Such processing is associated with a fixed 3 dB loss of the signal energy, which can be tolerated, as the signal is strong. In addition, comparing strong signal amplitude estimates over odd and even coherent accumulation periods 902 enables fine-tuning of the compensating signal waveform 127 scaling so as to keep equal strong signal amplitude estimates over odd and even coherent accumulation periods. Furthermore, in one attractive implementation of the present invention, the power of strong signals is estimated also over long coherent accumulation intervals 903 equal to the coherent accumulation interval set for the current level of weak signals acquisition.

In step 805, pre-calculation and discarding of the frequency bins injured by strong signal cross-correlation is performed. Preferably, a list of potentially interfering strong signals is generated, first, based on the measured signals strength. For every signal from the list, an ensemble of dangerously overlapping frequencies is calculated as $\{f_1-f_2+k f_{code}\}$ where $f_1$ is the Doppler shift of the signal to be acquired, f2 is the Doppler shift of the strong interfering signal, $f_{-code}$ is the C/A code repetition rate (1 kHz), and $k=0, \pm 1, \ldots, \pm k_{-max}$. The maximum index value is calculated as $k_{max}=[(f_1-f_2+N f_s)/f_{code}]$, where $f_s$ is the rate of producing accumulations by the preliminary accumulator 206, and N is the factor accounting for the shape of the coherent accumulation filter frequency response and the required interference suppression, and bracketing denotes keeping the integer part of the bracketed expression. Preferably, the filter is implemented as the preliminary accumulator 206, the interference suppression is assumed to be provided outside three lobes of the filter frequency response, and thus N=3. For each element f of the $\{f_1-f_2+k f_{code}\}$ ensemble, a preliminary accumulator 206 attenuation factor $A_1$ is calculated; then changed, due to digital accumulation, values of interfering frequency $f_a=f-f_s [f/f_s]$, and a sequence of attenuation factors $A_2$ (for every frequency position processed by the FFT 602) are calculated. If the difference of signal powers (interfering power minus that anticipated for the signal to be acquired) diminished by the two attenuation factors $A_1$ and $A_2$ still remains above a required threshold, then the corresponding frequency search bin is discarded.

According to one embodiment of the present invention, mitigation of the cross-correlating effect from a strong signal on the weak ones is accomplished with the help of combined action of two techniques. The $1^{st}$ is the compensation of strong signals at the input, before any signal processing, with the help of an artificial BPSK, as described above. Due to inaccurate evaluation of the strong signal parameters that can be, furthermore, non-stationary, the strong signal compensation is imperfect. Then, a $2^{nd}$ technique is aimed to exclude the residual cross-correlating effect. According to the $2^{nd}$ technique, estimated code phase, carrier frequency, and signal strength are used to predict frequency bins of the weak signals search that are potentially injured by cross-correlating from the earlier acquired strong signals, and to discard accumulations in these bins. All the calculations to predict potential cross-correlation are preferably performed in software. Discarding frequency bins is supported on the hardware level within the acquisition engine. The $2^{nd}$ technique does not rely on the carrier phase estimate that is the most volatile parameter of GPS signals. Combination with the above techniques further relaxes the requirements to the $2^{nd}$ technique. With already partly compensated strong signals, the probability of weak signal miss through the acquisition process due to discarding accumulations is decreased, and calculations can be simplified by averaging the cross-correlating effect over the code period, especially for long non-coherent accumulations of the order of seconds or tens of seconds. In step 806, processing of weak signals (WS) in the correlation channels 107 and in the acquisition engine 108 is performed. Steps 807 and 808 determine if the acquisition level is finished, and if this is the last acquisition level to be executed.

According to the present invention, the compensation of strong signals interfering with weak signals does not complicate tracking the stronger signals thus enabling accurate and robust compensation. Frequency bins of the weak signals' search pattern injured by a residual, under-compensated influence of strong interfering signals are robustly discarded by the $2^{nd}$ technique. While the particular embodiment of the apparatus for accelerating correlation processing of the present invention which has been disclosed above is for GPS signals, it can also be applicable to other spread spectrum signals such as, for example, those used in communication systems. While only certain preferred features of the invention have been illustrated and described, various alterations and modifications will no doubt become apparent to those skilled in the GPS art after having read the above disclosure. Accordingly, it is intended that the appended claims be interpreted as covering all alterations and modifications that fall within the true spirit and scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of weak signal acquisition during reception of a spread spectrum signal, for use in a positioning receiver, the method comprising:
   accumulating a strong signal of the received signal over a short coherent accumulation period;
   estimating a plurality of parameters of the strong signal;
   accumulating weak signals of the received signal over a long coherent accumulation period;
   compensating a strong signal cross-correlating effect in the weak signals to obtain a compensated signal, wherein the compensating step comprises:
      reproducing a waveform of the strong signal according to said parameters of the strong signal; and
      scaling the reproduced waveform to a first predetermined amplitude on odd short coherent accumulation periods and scaling the reproduced waveform to a second predetermined amplitude on even short coherent accumulation periods to generate a compensating waveform; and
   performing a weak signal acquisition process on the compensated signal.

2. The method of claim 1, wherein said first predetermined amplitude is substantially equal to zero.

3. The method of claim 1, wherein said second predetermined amplitude is substantially equal to twice an amplitude of the reproduced waveform.

4. The method of claim 1, wherein the compensated signal is obtained by subtracting the compensating waveform from the received signal.

5. The method of claim 1, wherein a level of acquisition is determined by a coherent accumulation period and a non-coherent accumulation period.

6. The method of claim 1, further comprising:
   updating said parameters of the strong signal; and
   repeating the compensating step, the performing step, and the updating step until a current level of acquisition is over.

7. The method of claim 6, further comprising:
   repeating the accumulating weak signals step, the compensating step, the performing step, the updating step until a final level of acquisition is over.

8. The method of claim 1 further comprising:
   determining a plurality of search bins of weak signals that are potentially injured by residual interference from the strong cross-correlating effect; —and
   masking the injured weak signal search bins.

9. The method of claim 6, wherein updating said parameters of the strong signal is based on the compensated signal.

10. The method of claim 1, wherein the long coherent accumulation period is an even integer multiple of the short coherent accumulation period.

11. The method of claim 1, wherein the short coherent accumulation period is between about 1 and 4 milliseconds.

12. The method of claim 1, wherein the long coherent accumulation period is about 20 milliseconds.

13. The method of claim 1, wherein the parameters of the strong signal comprise a code frequency, a code phase, a carrier frequency, a carrier phase, and a signal amplitude.

14. The method of claim 1, wherein compensating the strong signal cross-correlating effect in the weak signals is performed by a digital down-converter.

15. The method of claim 1, wherein the strong signal has a carrier-to-noise ratio above about 32 dBHz.

16. The method of claim 1, wherein weak signals are signals with a carrier-to-noise ratio below about 32 dBHz.

17. The method of claim 1, wherein said spread spectrum signal is received by a global positioning system (GPS) receiver.

18. A global positioning system (GPS) receiver comprising:
   a GPS radio frequency (RF) front-end for producing a digital waveform of a received signal;
   a digital down-converter, coupled to the RF front-end, for subtracting a compensating waveform from the digital waveform to generate a compensated signal;
   a signal memory, coupled to the digital down-converter, for storing the compensated signal; and
   a strong signal compensator, coupled to the digital down-converter and the signal memory, for reproducing waveforms of interfering signals, reproducing a waveform of a strong signal according to parameters of the strong signal, and scaling the reproduced waveform to a first predetermined amplitude on odd short coherent accumulation periods and scaling the reproduced waveform to a second predetermined amplitude on even short coherent accumulation periods to generate the compensating waveform.

19. The receiver of claim 18, wherein the digital down-converter comprises:
   a carrier NCO for generating a local intermediate frequency carrier waveform;
   a complex multiplier, coupled to the carrier NCO, for mixing the digital waveform and the local intermediate frequency carrier waveform to generate a mixed waveform;
   a digital-low pass filter, coupled to the complex multiplier, for low-pass filtering the mixed waveform;
   an adder, coupled to the digital low-pass filter, for combining the filtered mixed waveform and the compensating waveform to generate the compensated signal; and
   a quantizer, coupled to the adder and the signal memory, for digitizing the compensated signal.

20. The receiver of claim 18, wherein the compensating waveform is scaled to zero on odd periods and to twice an amplitude of the reproduced waveforms on even periods.

21. The receiver of claim 18 further comprising a plurality of strong signal compensators.

22. The receiver of claim 21 further comprising:
   a synchronizer, coupled to the signal memory, for generating signal measurement epoch and interrupt;
   a plurality of correlator channels, coupled to the signal memory and to the synchronizer, for calculating correlations between baseband digital samples of the digital waveform and signal replica samples of the compensating waveform, and deriving a plurality of signal parameters accordingly;

an acquisition engine, coupled to the correlator channels, for calculating a fast Fourier transform (FFT) of a number of the correlations, for incoherent accumulation of results of the FFT, and for comparing the results against a threshold;

a controller, coupled to the signal memory and the correlator channels, for tuning the correlator channels to generate the compensating waveform according to correlator channel settings;

a common random-access memory (RAM), coupled to the correlator channels, the acquisition engine, and the controller, for storing the correlations from the correlator channels, storing a correlator channel status at instants when the threshold is exceeded, and storing correlator channel settings that the controller applies to the correlator channels; and a processor with a memory and a user interface, coupled with the synchronizer, the controller and the common RAM, for computing the correlator channel settings, for deriving parameters of the received signal, and for determining a receiver position, velocity, or time.

23. The receiver of claim 18, wherein a strong signal compensator comprises:
   a code numerically controlled oscillator (NCO), for advancing a phase of a clear/acquisition (C/A) code of the reproduced waveforms of the interfering signals;
   a carrier NCO, for reproducing a carrier waveform of the interfering signals;
   a code generator, coupled to the code NCO, for C/A code generation of the reproduced waveforms of the interfering signals;
   a complex mixer, coupled to the carrier NCO and the code generator, for combining carrier and C/A code waveforms of the reproduced waveforms of the interfering signals;
   a low-pass filter, coupled to the complex mixer, for low-pass filtering the reproduced waveforms of the interfering signals; and
   a multiplier, coupled to the low-pass filter, for scaling the reproduced waveforms of the interfering signals to output the compensating waveform.

24. A global positioning system (GPS) receiver comprising:
   a GPS radio frequency (RF) front-end for producing a plurality of digital samples of a received GPS signal at an intermediate frequency;
   a digital down-converter, coupled to the RF front-end, for bringing to baseband and low-pass filtering the digital samples;
   a signal memory, coupled to the digital down-converter, for storing a plurality of packs of baseband digital samples output by the digital down-converter;
   a synchronizer, coupled to the signal memory, for generating signal measurement epoch and interrupt;
   a group of strong signal compensators, coupled to the digital down-converter and the signal memory, for reproducing waveforms of interfering signals and generating signal replica samples;
   a plurality of correlator channels, coupled to the signal memory and to the synchronizer, for calculating correlations between the packs of baseband digital samples and packs of generated signal replica samples, and for gathering statistics for deriving signal parameters accordingly;

an acquisition engine, coupled to the correlator channels, for calculating a fast Fourier transform (FFT) of a number of the correlations, for incoherent accumulation of results of the FFT, and for comparing the results against a threshold;

a controller, coupled to the signal memory and the correlator channels, for tuning the correlator channels to generate the packs of signal replica samples according to correlator channel settings;

a common random-access memory (RAM), coupled to the correlator channels, the acquisition engine, and the controller, for storing the correlations from the correlator channels, storing a correlator channel status at instants when the threshold is exceeded, and storing correlator channel settings that the controller applies to the correlator channels; and a processor with a memory and a user interface, coupled with the synchronizer, the controller and the common RAM, for computing the correlator channel settings, for processing of the statistics to derive parameters of received signals, and for determining a receiver position, velocity, or time.

25. The receiver of claim 24, wherein a strong signal compensator comprises:
   a code numerically controlled oscillator (NCO), for advancing a phase of a clear/acquisition (C/A) code of reproduced waveforms of interfering signals;
   a carrier NCO, for reproducing a carrier waveform of interfering signals;
   a code generator, coupled to the code NCO, for C/A code generation of reproduced waveforms of interfering signals;
   a complex mixer, coupled to the carrier NCO and the code generator, for combining carrier and C/A code waveforms of reproduced waveforms of interfering signals;
   a low-pass filter, coupled to the complex mixer, for low-pass filtering reproduced waveforms of interfering signals; and
     a multiplier, coupled to the low-pass filter, for scaling reproduced waveforms of interfering signals.

26. The receiver of claim 25, wherein the digital down-converter comprises:
   a carrier NCO for generating local intermediate frequency carrier samples;
   a complex multiplier, coupled to the carrier NCO, for mixing the digital samples and the local intermediate frequency carrier samples from the carrier NCO to output a mixed signal;
   a digital-low pass filter, coupled to the complex multiplier, for low-pass filtering the mixed signal;
   an adder, coupled to the digital low-pass filter, for combining the filtered mixed signal and output of the strong signal compensators; and
   a quantizer, coupled to the adder, for digitizing output of the adder with a predetermined number of bits.

27. A method of weak signal acquisition during reception of a spread spectrum signal, for use in a positioning receiver, the method comprising:
   (a) acquiring a strong signal through a first level of acquisition;
   (b) estimating a plurality of strong signal parameters;
   (c) setting a next level of acquisition;

(d) compensating the strong signal, wherein the compensating step comprises:
  reproducing a waveform of the strong signal according to parameters of the strong signal; and
  scaling the reproduced waveform to a first predetermined amplitude on odd short coherent accumulation periods and scaling the reproduced waveform to a second predetermined amplitude on even short coherent accumulation periods to generate a compensating waveform;
(e) updating said strong signal parameters;
(f) performing a weak signal acquisition process;
(g) repeating steps (d) through (f) until a current level of acquisition is over; —and
(h) repeating steps (c) through (g) until a final level of acquisition is over;
wherein acquisition and parameters estimation of the signals is performed throughout coherent integration intervals that are different for strong and weak signals.

28. The method of claim 27, wherein each level of acquisition is determined by a coherent accumulation period and a non-coherent accumulation period.

29. The method of claim 27 further comprising:
  (i) calculating a plurality of search bins of weak signals that are potentially injured by residual interference from strong cross-correlating signals; and
  (j) masking the injured weak signal search bins.

30. The method of claim 27, wherein step (d) is differently applied through sub-intervals of coherent integration intervals of weak signals.

31. The method of claim 29, wherein step (d) compensates with twice an amplitude of the strong signal on even coherent integration sub-intervals.

32. The method of claim 31, wherein the coherent integration intervals of weak signals coincide with the coherent integration intervals of the strong signal, and a number of coherent integration sub-intervals of the strong signal in one coherent integration interval of weak signals is an even integer.

33. The method of claim 27, wherein said coherent accumulation intervals are several times shorter than a data bit length.

* * * * *